United States Patent
Sherwood

(10) Patent No.: US 7,313,229 B1
(45) Date of Patent: Dec. 25, 2007

(54) SYSTEM AND METHOD FOR DELAYED OR REPEATED MESSAGE DELIVERY

(75) Inventor: Amy Sherwood, Marietta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 569 days.

(21) Appl. No.: 10/028,275

(22) Filed: Dec. 28, 2001

(51) Int. Cl.
*H04M 1/64* (2006.01)

(52) U.S. Cl. .................. 379/88.22; 379/69

(58) Field of Classification Search ......... 379/67.1–69, 379/88.13–88.18, 88.22–88.26
See application file for complete search history.

(56) References Cited

U.S. PATENT DOCUMENTS

| | | | | |
|---|---|---|---|---|
| 5,247,568 A | * | 9/1993 | Bergsman et al. | 379/88.23 |
| 5,260,986 A | * | 11/1993 | Pershan | 455/413 |
| 5,297,143 A | * | 3/1994 | Fridrich et al. | 370/445 |
| 5,333,180 A | * | 7/1994 | Brown et al. | 379/88.06 |
| 5,646,982 A | * | 7/1997 | Hogan et al. | 379/88.22 |
| 5,652,789 A | * | 7/1997 | Miner et al. | 379/201.01 |
| 5,870,454 A | * | 2/1999 | Dahlen | 379/88.14 |
| 5,930,471 A | * | 7/1999 | Milewski et al. | 709/204 |
| 6,052,440 A | * | 4/2000 | Yuhn | 379/88.13 |
| 6,085,101 A | * | 7/2000 | Jain et al. | 455/500 |
| 6,097,791 A | * | 8/2000 | Ladd et al. | 379/88.19 |
| 6,137,864 A | * | 10/2000 | Yaker | 379/88.22 |
| 6,259,772 B1 | * | 7/2001 | Stephens et al. | 379/88.23 |
| 6,442,250 B1 | * | 8/2002 | Troen-Krasnow et al. | 379/93.15 |
| 6,556,664 B1 | * | 4/2003 | Langsenkamp | 379/69 |
| 6,731,725 B1 | * | 5/2004 | Merwin et al. | 379/88.23 |
| 6,760,412 B1 | * | 7/2004 | Loucks | 379/88.13 |
| 6,788,946 B2 | * | 9/2004 | Winchell et al. | 455/459 |
| 2002/0099777 A1 | * | 7/2002 | Gupta et al. | 709/206 |
| 2002/0138582 A1 | * | 9/2002 | Chandra et al. | 709/206 |

\* cited by examiner

*Primary Examiner*—Fan Tsang
*Assistant Examiner*—Joseph T Phan
(74) *Attorney, Agent, or Firm*—Thomas, Kayden, Horstemeyer & Risley

(57) ABSTRACT

A system and method that records a message and then delivers the message to one or more recipients. The message may be delivered to the recipients at some determined later time. Each recipient may be able to receive the message at different times depending on data that is input with respect to each recipient. Also described are repeat call function that repeats a call until a live recipient answers the call, and repeat message function that repeats a recorded message to a recipient a determined number of times.

33 Claims, 5 Drawing Sheets

SYSTEM AND METHOD FOR DELAYED OR REPEATED MESSAGE DELIVERY

BACKGROUND

1. Field of the Invention

The present invention relates generally to delivery of voice messages. More specifically, the present invention is directed to a message delivery service that provides delivery options to deliver a recorded message at a designated time, or repeatedly, to one or more live recipients or to their voicemail mailbox or answering machine.

2. Background of the Invention

The proliferation of electronic communication media has increased the necessity to efficiently contact any individual or organization instantly. Electronic communication media, such as telephones, interactive pagers, and personal data assistants, are becoming increasingly ubiquitous, allowing instant communication with particular individuals who are also using such media. Each device requires knowledge of a specific access code, typically a unique identifying number for the media, such as a telephone number or a voicemail mailbox number. New media are constantly being introduced that enhance the already expanding choices for instant-delivery electronic communications media.

The telephone is the most commonly used electronic communication device. Many land-line telephones and cellular telephones have an associated electronic voicemail message system or answering machine that allows a caller to leave a message if the intended recipient does not answer a call after a predetermined number of rings. The intended recipient, having heard the rings or being otherwise notified of a message, may then access the electronic voicemail system or answering machine and hear the caller's message. The voicemail or answering machine message typically is stamped with a time and date label by the recipient's voicemail system or answering machine to indicate when the call or message was received, which is usually when the caller made the call or left the message. For most unanswered calls, such a system is sufficient, and serves the purposes of both the caller and the recipient.

A conventional voicemail delivery method is shown in FIG. 1. Although the method shown in FIG. 1 presents a series of steps in a particular order, the order of such steps may be changed without affecting the overall function or limitations of such a conventional method. For example, instead of choosing recipient mailboxes before recording a message, a caller may first record the message, and then choose recipient mailboxes.

As shown in FIG. 1, in a conventional voicemail system, in step 101a caller accesses the voicemail system by dialing an instant voicemail messenger delivery telephone number, or by connecting to a recipient's voicemail system when the recipient does not answer a telephone call. When the caller reaches the recipient's voicemail system, she must simply leave a message, which gets date and time stamped by the recipient's system. If the caller accesses an instant voicemail messenger delivery system, in step 102 the caller may choose which mailboxes are intended to receive a message. The caller has no other choices available to her. If the telephone call is directly made to one recipient, then additional voicemail mailboxes cannot be accessed.

However, if the caller directly uses a voicemail messenger delivery system, she may then choose one or more recipient mailboxes. In step 103, the caller records a message. In step 104, the caller may optionally review and/or change the recorded message. The caller may want to listen to the recorded message, add to the message, re-record it, or cancel it altogether. If the caller wants to re-record the message, he or she may do so in step 103. In step 105, the caller is then given the opportunity to send the message to the recipients' mailboxes. If the caller decides not to send the message, the caller may cancel the message at step 106 and compose either another message or completely abandon the message. If the message is sent in step 107, then the recipients will receive the message in their voicemail mailboxes. The received message typically receives a time and date stamp when the recipient's voicemail mailbox or answering machine receives the message.

Thereafter, the recipient may hear the message and the time/date that the message was received. Recipients of such electronically recorded messages typically associate the time a message is received with the time the message was sent by the caller because conventional voicemail delivery systems deliver a recorded voicemail message instantly. Thus, if a sender sends a voicemail at an odd hour, the recipient becomes aware that the message was sent at such an hour.

However, situations arise when a caller may not want to disturb a recipient by ringing her telephone, such as when the recipient is at an important event and does not wish to be disturbed. On the other hand, the caller may not be able to wait until a later time to call the recipient because the caller may then be engaged in other activities that are not conducive to making telephone calls.

As a non-limiting example, an employee may want to relay important information to a supervisor, but it is late in the evening. The employee does not wish to call the supervisor at such an inopportune time to relay the message because the supervisor may be awakened or otherwise disturbed by the call. Also, the employee may not wish the time of the voicemail message to be marked as late evening. Conventionally, a common solution to this dilemma is for the employee to wake up at the right time the next morning, which could be earlier than the employee usually gets up, to be able to relay the information to the supervisor either directly through the telephone or via the supervisor's voicemail box. If the employee fails to make the telephone call at the right time, for example, either by oversleeping or forgetting to make the telephone call, then the employee, employer, or business may suffer from the lack of the employer's timely knowledge of the information. Conventional voicemail delivery and telephone systems are incapable of addressing the messaging needs of the employee in these circumstances.

Similarly, if during a late hour in the evening, a person wants to deliver information to one or more people who would likely not want to be disturbed at that time, the most common solution is for the person to write down all her thoughts and messages and then relay them to each of the other persons the next morning. Such inconvenience is commonly endured to prevent inopportune telephone calls and voice messages to potential recipients and to maintain a courteous relationship between the parties. Conventional voicemail delivery and telephone systems, however, are also not designed to address the messaging needs in the foregoing situation.

As another non-limiting example, late at night prior to embarking on a red-eye international flight, a supervisor remembers that she must relay an important voicemail message to one or more of her employees. Although it may be acceptable for her to send an all-company voicemail to her employees' voicemail boxes before she boards the flight, it would be more professional if she could record such a message, and have the voicemail system relay the message, at a later, more appropriate business time, for example, early the next morning, to all her employees. The early morning voicemail would indicate that the supervisor is efficient in informing her employees of the important message first thing in the morning, and it even may be necessary to give the impression to the employees that the supervisor is at work or in town. However, conventional voicemail systems are incapable of providing the supervisor with such an option. Thus, the caller is unnecessarily inconvenienced by the limitations of present voicemail systems and must conform to the limited options provided by such systems to send voicemail messages at an appropriate time.

As another non-limiting example, a caller may wish to deliver a message to a recipient, and wishes that only a live person receives that message, as opposed to the message being delivered to a voicemail mailbox or answering machine. However, conventional message delivery systems do not provide such delivery options, and as a consequence the caller must inconveniently either leave a message for the recipient or repeatedly call the recipient until the recipient herself answers the telephone.

SUMMARY OF THE INVENTION

The present invention overcomes the drawbacks of current limited voicemail systems and answering machines by providing a system and method of selectively sending a recorded electronic message at a pre-designated time, and optionally delivering the message only to a live recipient, repeating the message at different times to the same person, or repeating the message at different times to multiple persons.

In accordance with an exemplary embodiment, there is provided a system and method of selectively delivering a recorded message to a recipient by first recording the message, and then selecting the desired time and date for the delivery of the message. When that selected date and time is reached, the recorded message is then sent, either through telephone rings or delivery of the message to a voicemail box, to the recipient and the recipient is allowed to hear the pre-recorded message, or the message is delivered to the recipient's voicemail mailbox or answering machine.

In another exemplary embodiment of the present invention, the selective time delivery system is used to send messages to several persons with the option of each person receiving the message at a different time.

An exemplary embodiment of the present invention is a method of arranging for an electronically-recorded message to be delivered to a communication medium of a recipient at a selected time. The method includes the steps of recording the message, inputting an access code for accessing the communication medium of the recipient, and indicating a delivery time for delivery of the message to the communication medium of the recipient.

Another exemplary embodiment of the present invention is a method of sending an electronically-recorded message to a communication medium of a recipient at a selected time. The method includes the steps of recording the message, inputting an access code for accessing the communication medium of the recipient, indicating a delivery time for delivery of the message to the communication medium of the recipient, and sending the message to the communication medium of the recipient when the time reaches the delivery time.

Another exemplary embodiment of the present invention is a method of sending an electronically-recorded message to oneself at a selected time. The method includes the steps of recording the message, inputting an access code for accessing a communication medium of oneself, indicating a delivery time for delivery of the message to the communication medium of oneself, and sending the message to the communication medium of oneself when the time reaches the delivery time.

Another exemplary embodiment of the present invention is a system for arranging for an electronically-recorded message to a communication medium of a recipient at a selected time. The system includes means for recording a message, means for inputting an access code for accessing a communication medium of a recipient, means for indicating a delivery time for delivery of the message to the communication medium of the recipient, and means for sending the message to the communication medium of the recipient when the time reaches the delivery time.

Another exemplary embodiment of the present invention is a system for sending an electronically-recorded message to a communication medium of a recipient at a selected time. The system includes means for recording a message, means for inputting an access code for accessing a communication medium of a recipient, means for indicating a delivery time for delivery of the message to the communication medium of the recipient, means for keeping track of clock time, and means for sending the message to the communication medium of the recipient when the clock time reaches the delivery time.

As used throughout this specification, an "access code" is a unique alphanumeric array that is specific to an electronic device and serves as the "identity" for the device. Contacting such an electronic device usually requires use of its specific access code. For example, for a telephone, its telephone number would be its access code. For a specific voicemail mailbox, for example, its voicemail mailbox number would be its access code. For any type of electronic media that may be accessed remotely, its identifying alphanumeric array that enables remote access to the media is its access code.

It is therefore an object of the present invention to provide a flexible message delivery system and method that does not require the message sender to send a message instantly upon creating the message.

It is another object of the present invention to provide a system and method for recording a message and selectively delivering the message at a designated time to one or more designated recipients.

It is still another object of the present invention to selectively deliver a recorded message to one or more designated recipients at a designated time, and only deliver the message when a live person answers the telephone.

These and other objects of the present invention will become apparent upon a reading of the following detailed description in conjunction with the associated drawings.

DETAILED DESCRIPTION OF THE INVENTION

The present invention provides an improved electronic message delivery system and method that selectively delivers a recorded message according to a set of criteria determined by a sender.

Figure 1:
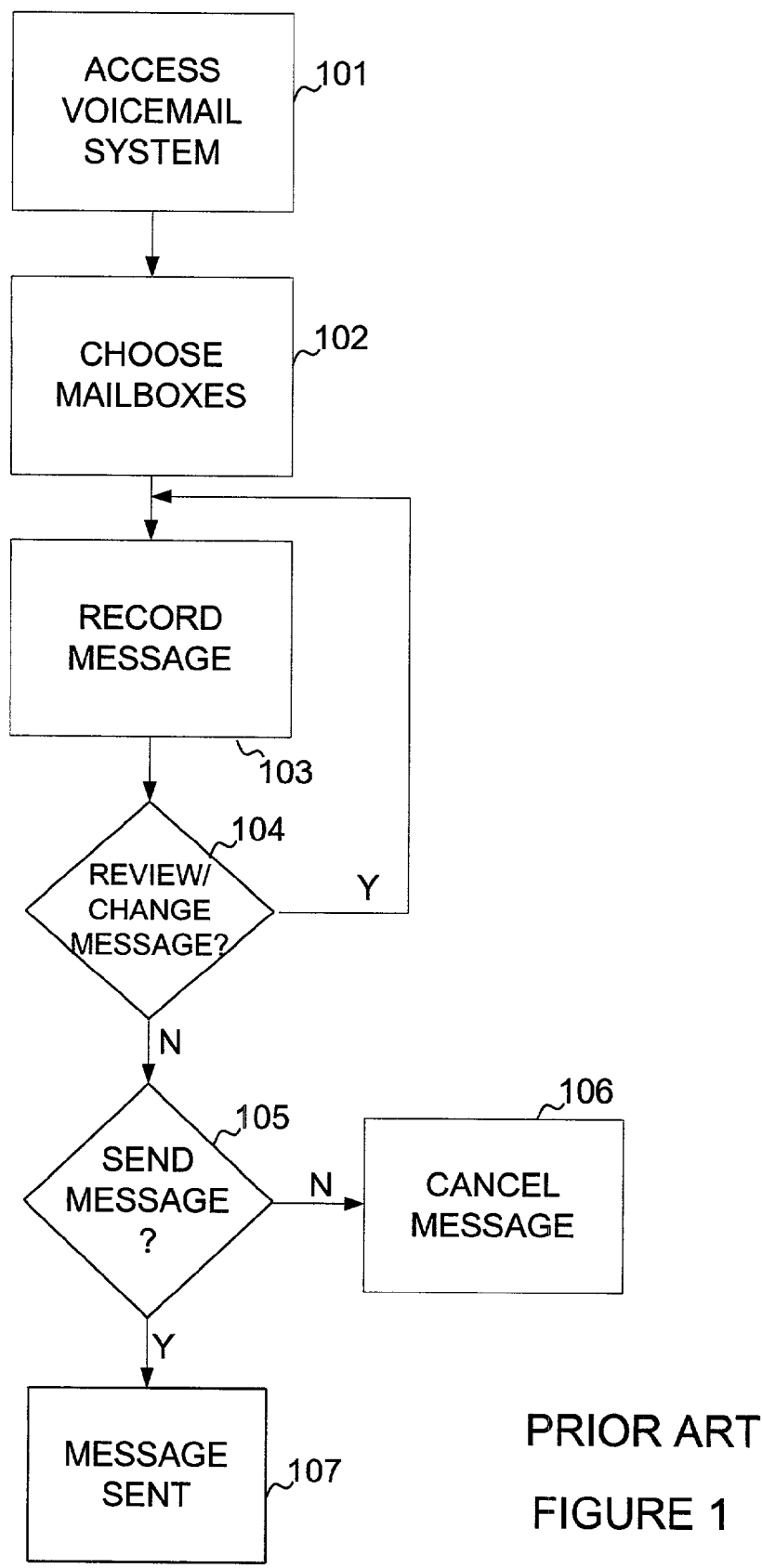
FIG. 1 illustrates a conventional voicemail delivery system wherein a voicemail message is instantly delivered to a recipient after it is recorded.
Figure 2A:
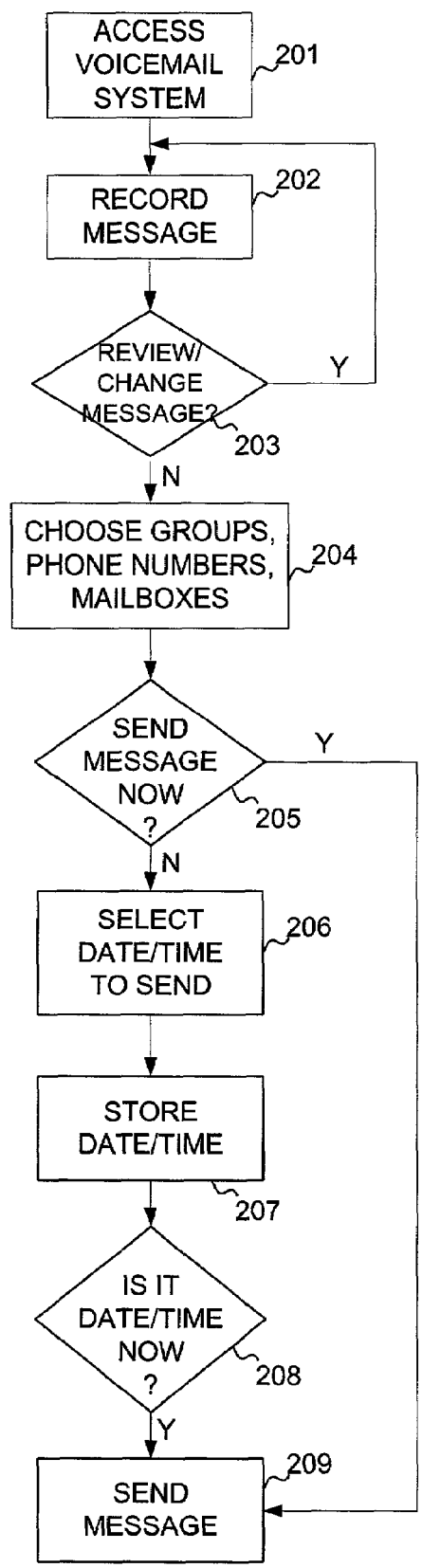
FIGS. 2a and 2b illustrate an exemplary embodiment of a method and system according to the present invention wherein a recorded message is delivered at a designated time to one or more recipients.
Figure 2B:
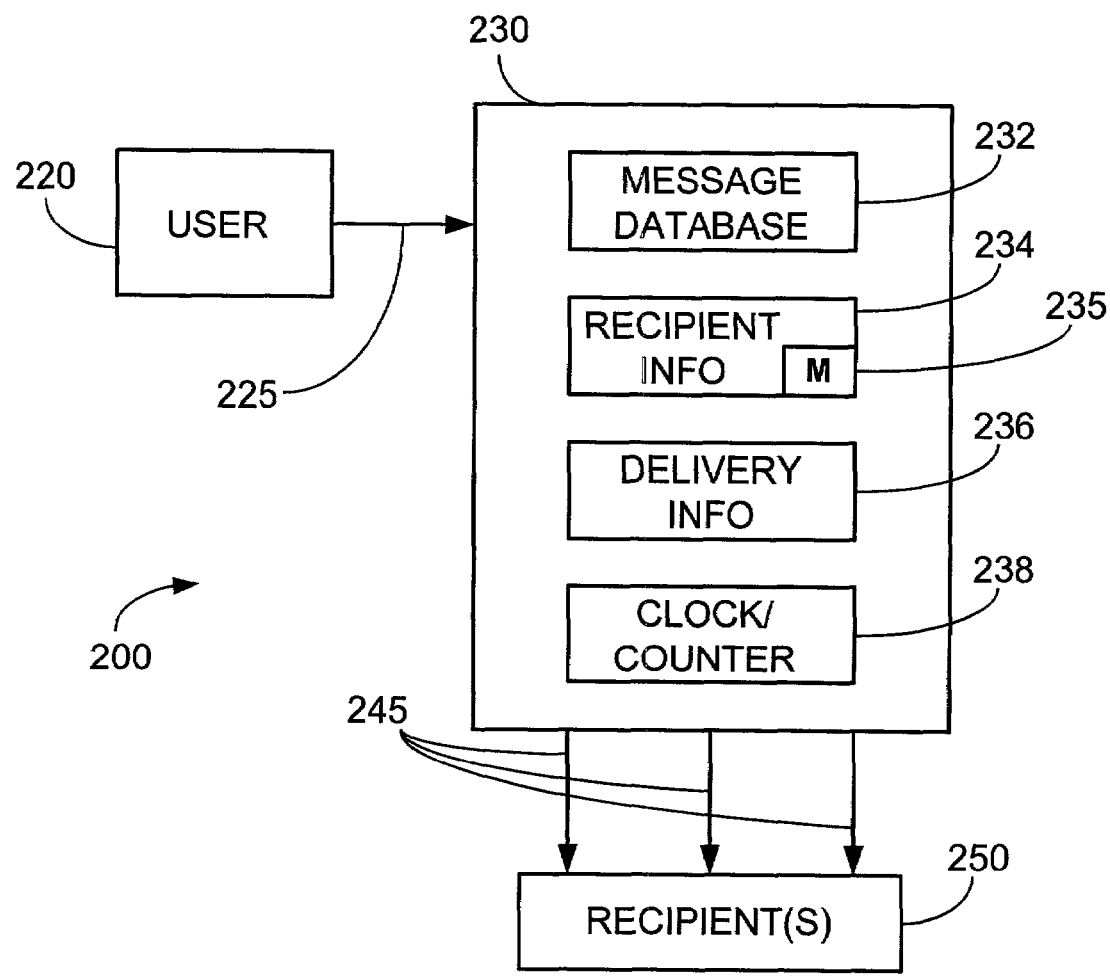

Exemplary embodiments of a method and system of the present invention are shown in FIGS. 2a and 2b, respectively. An exemplary embodiment of a system 200 of the present invention is one that can perform the method depicted in FIG. 2a (for example, a computer programmed to perform the steps described herein). Thus, throughout this disclosure, the terms "system" and "method" of selective delivery of recorded messages are used interchangeably. Furthermore, the individual components, hardware and software, that are described herein for implementing the system and method of the present invention are known to one having ordinary skill in the art, although the particular combination, uses, and method of the present invention are not conventional.

Although the exemplary embodiments described below are depicted in a particular sequential order, the order may be changed without departing from the teaching of the process, as long as the overall function and goals of the process are substantially satisfied. In the examples shown in FIGS. 2a and 2b, a message is recorded before the recipient telephone numbers/voicemail boxes are selected. However, the message may be recorded after the telephone numbers/voicemail boxes are selected, without departing from the overall teaching of the process.

As shown in FIGS. 2a and 2b, in an exemplary embodiment of the method or system 200 of the present invention, a user 220 accesses a voicemail system 230 in step 201 in order to create a message to be sent to one or more message recipients. The user 220 may access the system 230 through telephone line 225, through a cellular connection, or through other communication means. The voicemail system 230 may either be a service provided through a telephone company, or part of a stand-alone device which may be purchased and connected to a telephone line at home or work to perform the below described process.

In step 202, the caller records a message to be sent to the recipients. Such messages are stored in a message database 232 in communication with the system 230. In step 203, the caller may review and/or change the message by listening to the message, adding to the message, replacing it with another message, or canceling it altogether. If the caller decides to re-record the message, then she may repeat the recording step 202. An original message that has been canceled or replaced may be deleted from the message database 232 and optionally replaced with a new message.

If the message is satisfactory, in step 204 the caller chooses telephone numbers or voicemail boxes that will receive the recorded message. These telephone numbers or voicemail mailboxes, and other data described in more detail below, may be input into the voicemail delivery system of the present invention using conventional touch-tone or voice-recognition data input technology known to one having ordinary skill in the art. Telephone numbers or voicemail mailboxes that are input into the system 230 by user 220 are stored in a recipient information database 234 and associated with its corresponding message in the message database 232.

Furthermore, a memory storage area 235 allows a user 220 to store groups of named recipients under user-defined categories. The groups may be any number of recipients that the memory 235 and system 230 are capable of handling and may be coded with a specific alphanumeric code. For example, a user 220 may group her thirty co-workers as "Group 1" and designate them as code 5555, and group her four-member family as "Group 2" and designate them as code 6666. One way this can be done by signaling the system 230 that a group is being designated, and then entering the telephone numbers and mailbox numbers of the members of the group, followed or preceded by a user-designated code. The system 230 may then store that group designation into its memory center 235 such that when the user 220 designates the code of a defined group, the system 230 will automatically recognize which recipients are intended for the intended message being delivered.

In step 205, the voicemail system may then inquire of the user 220 whether the recorded message is to be sent immediately. If the user 220 selects the immediate delivery option, in step 209 the message is sent to the recipients. The called telephone then rings for a pre-set period of time set by the system, for example, 30 seconds, or until someone picks up the telephone, and is notified that a voicemail message is being delivered to the person, or until a voicemail or answering machine intercepts the telephone call.

If the user 220 decides that the message is not to be sent immediately, and indicates so at step 205, then the user 220 is prompted by the system to enter a date and time at which the recorded message should be delivered to the telephone numbers and voicemail boxes. In step 207, all of the time and date information entered by the user 220 is stored into a memory storage area 236 of the system that stores message delivery information. The memory storage area 236 preferably has a running time keeper 238, such as an internal clock or counter, which keeps track of the current time and date, and places all recorded messages into a delivery queue to send out when the stored delivery time and date of each message is reached.

In step 208, the memory storage area 236 of the system performs a periodic check of the current date and time and determines whether the time is appropriate for any of its queued stored messages to be sent. Until the appropriate designated time and date is reached, the recorded message is retained in the message storage area 232. When system 230 determines that the caller-designated date and time of delivery of a particular message has been reached in step 208, in step 209 the message is sent to the recipients 250 through various delivery means 245, such as, for example, telephone wire, computer networks, or cellular connections. The recipients 250 are those that the user 240 had previously designated in step 204 and whose information is stored in database 234 or memory center 235. When the message is sent to designated telephone numbers and voicemail boxes, the recipients 250 may then be prompted to hear the message, or the message is recorded into the recipients' voicemail mailboxes or answering machines, to be retrieved by the recipients at a later time.

Some of the advantages of the system and method described above include the flexibility of being able to record a message at any time and designate a time for the message to be sent to a particular telephone number or voicemail mailbox. The recipients would be able to hear the caller's recorded voice instructions and respond accordingly. Additionally, a caller may use the system and method disclosed herein to send reminder messages to herself about important issues or meetings. For example, a traveler may use the system of the present invention to send herself a wake up call including a message to perform a certain task, to be delivered at a designated time the next morning. The next morning, her telephone will ring at the designated time determined and programmed the prior night, and include the message and reminder that the traveler wanted to be reminded of in the morning. Many other advantages and uses of the system are possible, and are within the purview of those skilled in the art, and those who may utilize this technology.

Figure 3A:
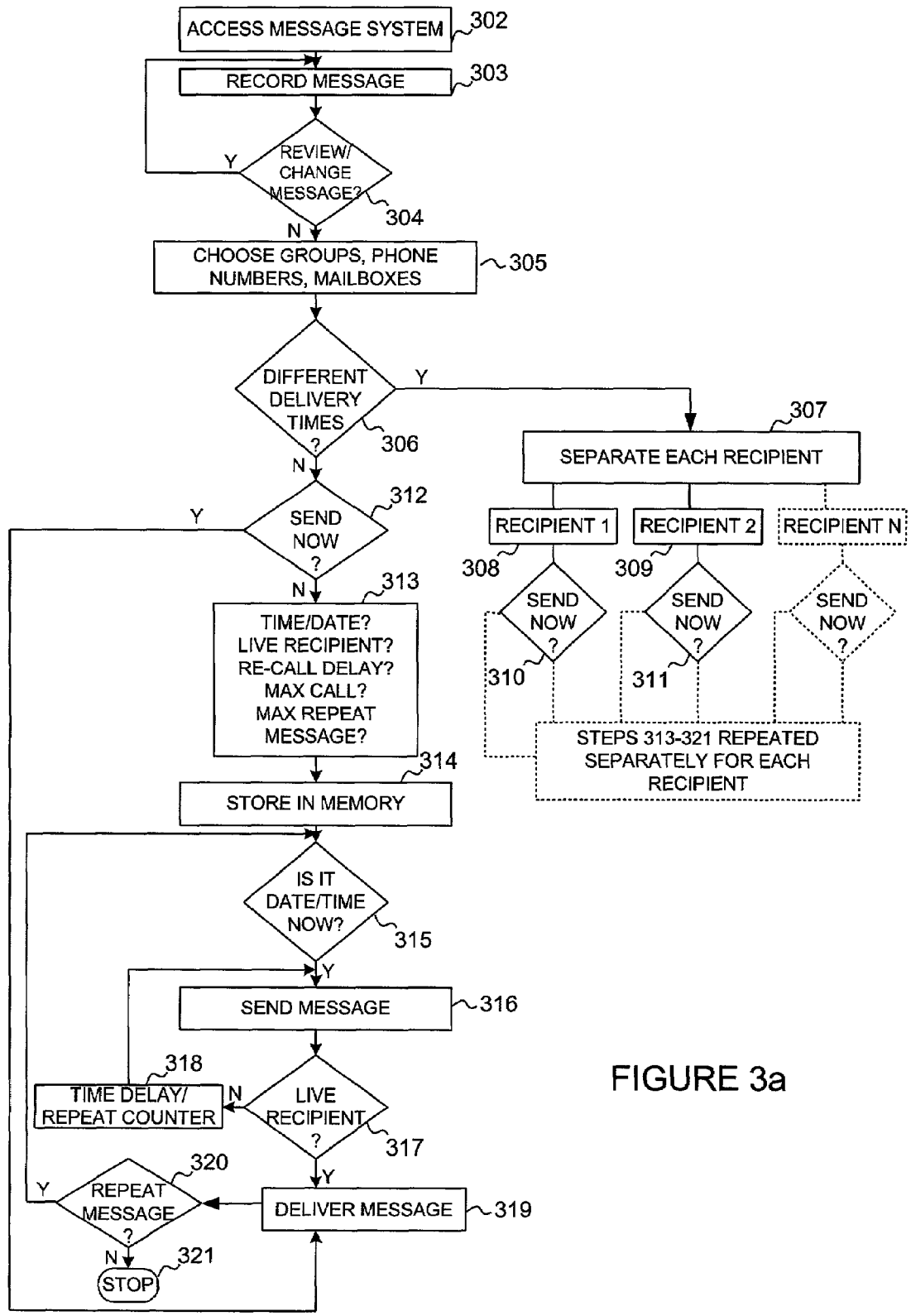
FIGS. 3a and 3b illustrate another exemplary embodiment of a method and system according to the present invention wherein a recorded message may be repeatedly delivered to the same recipient, or delivered to different recipients at the same or different times, or only delivered to live recipients.
Figure 3B:
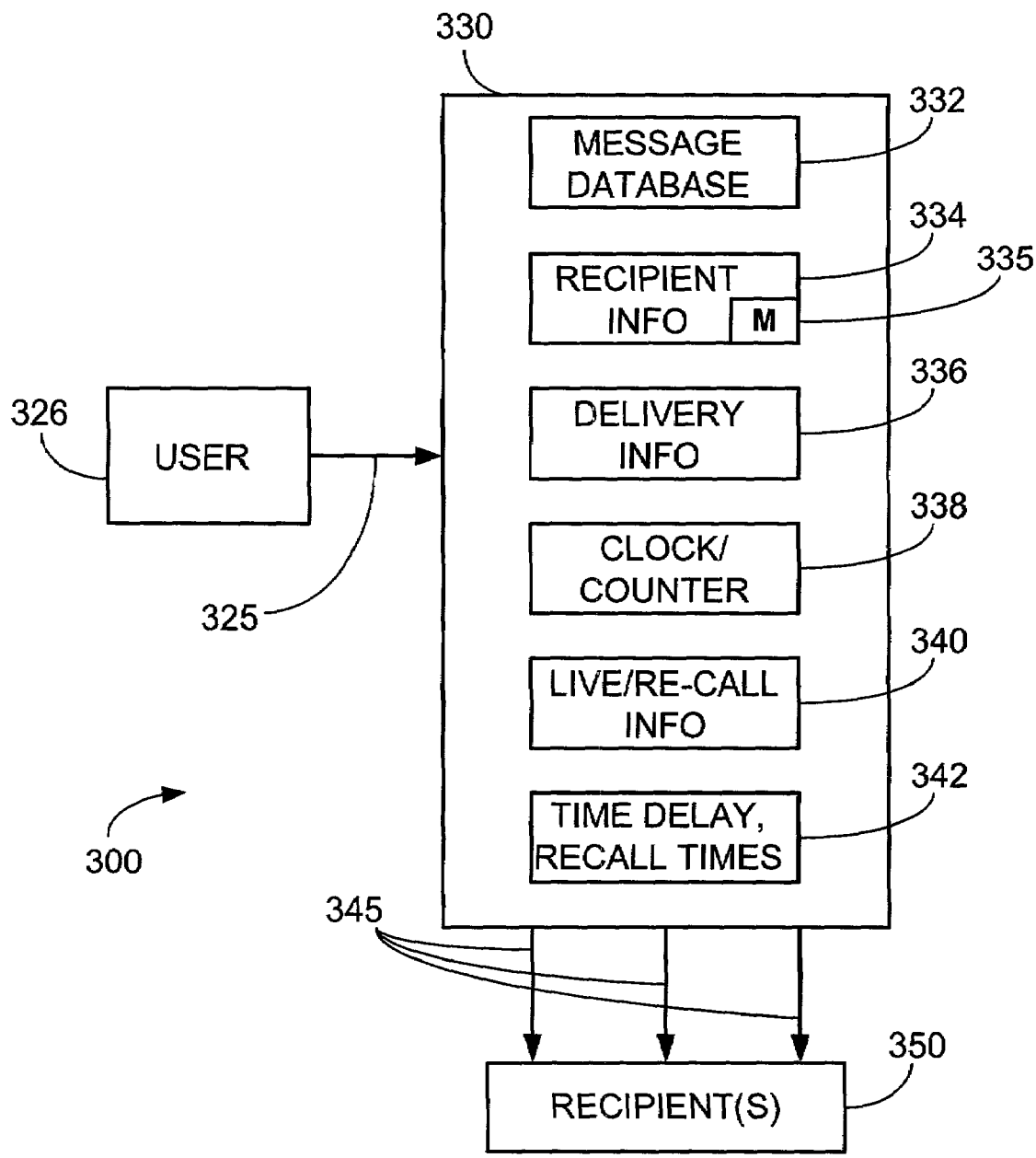

Other exemplary embodiments of a method and system 300 in accordance with the present invention are shown in FIGS. 3a and 3b. The embodiments shown in FIGS. 3a and 3b have additional functionality, features and capabilities beyond those of the method and system 200 of FIGS. 2a and 2b. At a basic level, the method and system 300 of FIGS. 3a and 3b are capable of performing all of the functions of the method and system of FIGS. 2a and 2b. Additionally, the embodiments of FIGS. 3a and 3b allow for, among other features, different delivery times for different recipients, delivery of the recorded message, if desired, only to live recipients, and repeatedly sending the same message to the same recipient for a designated number of times.

In the exemplary embodiments shown in FIGS. 3a and 3b, a method and system 300 for selective delivery of electronically recorded message is shown that has many optional and novel features. Those features of the latter embodiments shown in FIGS. 3a and 32 which are similar to features shown in FIGS. 2a and 2b will function in the same way as those described above. In step 302, a user 326 using the system begins by accessing the voicemail system 330. In step 303, the user 326 may first record a message, which is stored in message database 332, and have the option of reviewing and/or changing the message in step 304, as previously described above with respect to step 203 in the method of FIG. 2a. If the recorded message is satisfactory, in step 305 the caller may then choose recipient groups, telephone numbers and voicemail mailboxes that will receive the recorded message. Recipient information is stored in storage area 334. If a prior recipient group is signaled by the user 326 through a designated code, then associated recipients relating to the group and stored in memory storage area 335 are included in the intended recipient pool of the recorded message.

In Step 306, if more than one recipient was input into the system at step 305, then the system prompts the caller to decide whether each recipient should receive the recorded message at the same time, or whether at least one recipient should receive the message at a different time relative to the other recipients. If only one telephone number or mailbox is input into the system at step 305, then the system automatically progresses to step 312.

However, if more than one recipient has been designated in step 305, and the user 326 prefers that at least two of the recipients 350 should get the recorded message stored at 232 at different times and/or dates, then the system 330 proceeds to step 307. In step 307, a separate branch is established for each recipient that was designated in step 305. For each group, telephone number or mailbox, the system 330 prompts the user 326 to enter data that would correspond to the caller's intention for message delivery to each recipient. For example, in steps 308 and 309, a branch is established for Recipient 1 and Recipient 2, respectively. In steps 310 and 311, respectively, the user 326 inputs individual delivery instructions for Recipient 1 and Recipient 2, respectively, in response to prompts by the system 330.

The process that the system 330 follows for each recipient of multiple recipients 308, 309, etc., will substantially follow the same sequences and steps as in steps 312-321, which will be described in more detail below.

When there are a large number of recipients, for example, 200 recipients, the system 300 allows the user 220 to lump together multiple recipients into recipient groups, for example, of 50 recipients each, stored in memory area 335, as described above. Each recipient group can then have a unique set of delivery criteria.

If there is only one recipient designated at step 305, or, alternatively, if there are multiple recipients designated at step 305, but the user 326 indicates at step 306 that all recipients will have the same delivery date/time, the system 300 then progresses to step 312. At step 312, the system inquires whether the recorded message should be sent instantly, much like a conventional voicemail delivery system. If the user 326 desires instant delivery of the recorded message, then the message is instantly sent at step 319 to the designated recipients 350, and the process is complete.

However, if the user 326 wishes not to send the recorded message instantly when the system 300 prompts the question at step 312, the user is prompted to input a date and time 313 for the message to be delivered to the designated recipients. Such date and time delivery information is stored at delivery information storage area 336.

Additionally, the system 300 may ask the user 326 whether she wishes to have the message delivered only to a live recipient, as opposed to a voicemail or answering machine. The system will detect an error if the user demands that the message is delivered to a live person and at least one recipient is a voicemail box. Conventional software may be used to detect whether the answer to a telephone call is a live person or a recorded message. Also, the system may ask the user at 313 that if the caller would like to re-try to send the message to a live recipient, how many re-tries would be desired, and what time delay between each retry would be desirable. Finally, the system 300 preferably asks the caller whether the caller would like to re-send the message, and how many times, to the recipients, even if the recipients have already heard the message. The caller may input all this information at step 313. The responses that user 326 submits to system 330 are input into memory storage area 340 for responses that are "yes" or "no", and into memory storage area 342 for time constants and numerical values.

If the caller does not input or does not wish to consider some of the prompted data input, subsequent steps of the process, as described in more detail below, directly needing such data to operate, will be skipped by the system 300. Optionally, the system may supply default values for values not entered by the caller. Also, optionally, pre-set system limits may be imposed to prevent unreasonable input parameters, such as a caller prompting the system 300 to call a recipient every 10 minutes, for 100 times, indefinitely, or until a live person answers the call.

The message, and all related data input by the caller at step 313, are stored in step 314 in designated memory storage areas 332, 334, 335, 336, 340 and 342. The system 330 preferably has a running timer 338, such as a clock or counter, that keeps track of the date and time and monitors the messages that are in queue to be delivered at determined dates and times under designated conditions. In step 315, the memory storage area of the system periodically monitors (e.g., once a minute, once an hour, etc.) the information for date and time for delivery of each message in queue. As long as the date and time for delivery of a message has not been reached, the message is maintained in the memory storage area 232.

However, when the date and time for delivery of the message is reached, in step 316 the message is sent to the recipients 350 through various communications means 345, which are similar to communications means 335, and may be, for example, telephone lines, computer networks or cellular connections.

If at step 313, the user 326 inputs directions that the message should be delivered to a live recipient, and a live recipient does answer the call 317, then in step 319 the message is delivered to the live recipient. In step 320, the system checks its instructions. If there is no instruction by the user that the message should be sent more than once, the system terminates the message delivery process and optionally may erase the message and associated instructions from its memory storage area 332. However, if the user 326 had provided directions at step 313 that the message should be sent repeatedly, then the system 330 will be prompted to re-send the same message according to the instructions that were stored in step 340 according to the delay numbers stored in 342. Such instructions stored in memory storage area 342 include the period for waiting before re-sending the message, and the number of times the message should be sent to the recipients.

Alternatively, if at step 313, the user 326 had provided directions that the message should be delivered to a live recipient, and in step 317 the system 330 determines that no live recipient answers the call, then the system is prompted at step 318 to wait for the period of time that the caller had indicated in the instructions provided in step 313 and stored in area 342. After waiting for the designated period of time stored in area 342, the system 330 is prompted in step 316 to send the message to the recipients 350, until either the system determines in step 317 that a live recipient has answered the call, or the call is repeated for the total number of times that the user input as the maximum number of calls at step 313 and stored in area 342. Optionally, the message may be repeated in step 320 if the caller had input instructions in step 313 and stored in area 340 that the call should be repeated a determined number of times, which is stored in area 342. Finally, when the call has been repeated the maximum allowed number of times, the system then stops at step 321. Optionally, the message and associated instructions are then deleted from the storage memory of the system.

The exemplary method and system of the embodiments of the present invention that are shown in FIGS. 3a and 3b have numerous advantages over conventional message delivery methods and systems. For example, a user may wish to have a message sent to different persons at different times, and have the same message repeated to certain individuals more than once. Additionally, there may be instances where a message may best be handled when a live person answers the telephone call.

As a non-limiting example, a person may wish to remind herself of different activities to attend to or conduct during a course of a workweek. Thus, on Sunday, the person may make a series of recorded messages and have those messages delivered to her own telephones or voicemail boxes at various times during the course of the workweek. Thus, she can be reminded of such activities by her own voice message through a telephone call by the system of the present invention. If the message of each call is to be heard once, any embodiment described herein may be used. However, if the message is to be repeated regularly throughout the course of the week at different times and at different telephone numbers, then the system 300 of the embodiment of FIG. 3b may be used.

An additional advantage of the exemplary embodiments of the method and system of the present invention for selective delivery of electronic messages is the ability of the user to change her mind about the message delivery. The user may access the system prior to the recorded message being sent out to all recipients, and delete and/or add to or re-record the message or delivery instructions from the system's queue and memory. This advantage is very beneficial when a caller uses the system to send a delayed message that the caller later wishes to retract, before the message has been sent out. The caller simply has to access the system again and remove the message from its "standby" mode or its place in the queue. Conventional message delivery systems, lacking in delayed message sending capability, do not have the ability to retract messages before the messages are sent.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of arranging for an electronically-recorded message to be delivered to a communication medium of a second user at a selected time, said method comprising:

recording the message by a first user on a stand-alone communication device in direct connection to a telephone line as customer premises equipment;

inputting an access code on the stand-alone communication device for accessing the communication medium of the second user;

indicating a delivery time for delivery of the message from the stand-alone communication device to the communication medium of the second user, wherein the message is selectable for retraction by canceling delivery of the message before the delivery time;

storing a plurality of groups of named recipients under user-defined categories and assigning each of the plurality of groups with a specific alphanumeric code;

determining whether each recipient of the message should receive the message at the same time; and determining individual delivery instructions if any recipient should receive the message at a different time, wherein the first user is distinct from the second user; wherein the communication medium is a voicemail mailbox; and wherein the access code is a voicemail mailbox number.

2. The method of claim 1, further comprising:

inputting a plurality of access codes for accessing a plurality of communication media.

3. The method of claim 2, further comprising:

indicating a plurality of delivery times, each delivery time corresponding to delivery of the recorded message to each of a plurality of communication media.

4. The method of claim 3, further comprising:

indicating whether the message should only be delivered if the second user directly receives the message.

5. The method of claim 4, further comprising:

indicating a re-send delay period used to re-send the message to a second user after a re-send delay period if the recipient does not directly receive the message.

6. The method of claim 5, further comprising:

indicating a maximum re-send message number selected by the first user used to re-send the message to a recipient a maximum number of times when the second user does not directly receive the message.

7. The method of claim 6, further comprising:

indicating a re-send message number used to re-send the message to a second user a number of times.

8. The method of claim 1, wherein the communication medium is a telephone.

9. The method of claim 8, wherein the access code is a telephone number for the telephone.

10. A method of sending an electronically-recorded message to a communication medium of a second user at a selected time, said method comprises:

recording the message by a first user on a stand-alone communication device in direct connection to a telephone line as customer premises equipment;

inputting an access code on the stand-alone communication device for accessing the communication medium of the second user;

indicating a delivery time for delivery of the message to a communication medium of the recipient second user;

sending the message from the stand-alone communication device to the communication medium of the recipient second user when the time reaches the delivery time, wherein the message is selectable for retraction by canceling delivery of the message before the delivery time;

storing a plurality of groups of named recipients under user-defined categories and assigning each of the plurality of groups with a specific alphanumeric code;

determining whether each recipient of the message should receive the message at the same time; and determining individual delivery instructions if any recipient should receive the message at a different time, wherein the first user is distinct from the second user; wherein the communication medium is a voicemail mailbox; and wherein the access code is a voicemail mailbox number.

11. The method of claim 10, wherein the communication medium comprises a plurality of communication media, each communication medium having its own unique access code.

12. The method of claim 11, further comprising:

inputting a plurality of access codes for accessing a plurality of communication media.

13. The method of claim 12, further comprising:

indicating a plurality of delivery times, each delivery time corresponding to delivery of the recorded message to each of a plurality of communication media.

14. The method of claim 13, further comprising:

indicating whether the message should only be delivered if the second user directly receives the message.

15. The method of claim 14, further comprising:

indicating a re-send delay period used to re-send the message to a second user after a re-send delay period if the second user does not directly receive the message.

16. The method of claim 10, wherein the communication medium is a telephone.

17. The method of claim 16, wherein the access code is a telephone number for the telephone.

18. A system for arranging for an electronically-recorded message to a communication medium of a second user at a selected time, said system comprising:

means for recording by a first user a message on a stand-alone communication device in direct connection to a telephone line as customer premises equipment;

means for inputting an access code on the stand-alone communication device for accessing a communication medium of the second user;

means for indicating a delivery time for delivery of the message to a communication medium of the second user; means for sending the message from the stand-alone communication device to the communication medium of the second user when the time reaches the delivery time;

means for selecting for retraction the message by canceling delivery of the message before the delivery time;

means for storing a plurality of groups of named recipients under user-defined categories and assigning each of the plurality of groups with a specific alphanumeric code;

means for determining whether each recipient of the message should receive the message at the same time; and means for determining individual delivery instructions if any recipient should receive the message at a different time, wherein the first user is distinct from the second user; wherein the communication medium is a voicemail mailbox; and wherein the access code is a voicemail mailbox number.

19. The system of claim 18, wherein the communication medium comprises a plurality of communication media, each communication medium having its own unique access code.

20. The system of claim 19, further comprising:

means for inputting a plurality of access codes for accessing a plurality of communication media.

21. The system of claim 20, further comprising:

means for indicating a plurality of delivery times, each delivery time corresponding to delivery of the recorded message to each of a plurality of communication media.

22. The system of claim 21, further comprising:

means for indicating whether the message should only be delivered if the recipient directly receives the message.

23. The system of claim 22, further comprising:

means for indicating a re-send delay period used to re-send the message to a second user after a re-send delay period if the recipient does not directly receive the message.

24. The system of claim 18, wherein the communication medium is a telephone.

25. The system of claim 24, wherein the access code is a telephone number for the telephone.

26. A system for sending an electronically-recorded message to a communication medium of a second user at a selected time, said system comprising:
- means for recording by a first user a message on a stand-alone communication device in direct connection to a telephone line as customer premises equipment;
- means for inputting an access code on the stand-alone communication device for accessing a communication medium of the second user;
- means for indicating a delivery time for delivery of the message to a communication medium of the second user;
- means for keeping track of a clock time;
- means for sending the message from the stand-alone communication device to the communication medium of the second user when the time reaches the delivery time;
- means for selecting for retraction the message by canceling delivery of the message before the delivery time;
- means for storing a plurality of groups of named recipients under user-defined categories and assigning each of the plurality of groups with a specific alphanumeric code;
- means for determining whether each recipient of the message should receive the message at the same time; and
- means for determining individual delivery instructions if any recipient should receive the message at a different time, wherein the first user is distinct from the second user; wherein the communication medium is a voicemail mailbox; and wherein the access code is a voicemail mailbox number.

27. The system of claim 26, wherein the communication medium comprises a plurality of communication media, each communication medium having its own unique access code.

28. The system of claim 27, further comprising:

means for inputting a plurality of access codes for accessing a plurality of communication media.

29. The system of claim 28, further comprising:

means for delivering the message at a plurality of delivery times, each delivery time corresponding to delivery of the recorded message to each of a plurality of communication media.

30. The system of claim 29, further comprising:

means for determining whether the message should only be delivered if the second user directly receives the message.

31. The system of claim 30, further comprising:

means for delaying for a period of time before re-sending the message to the second user if the second user does not directly receive the message.

32. The system of claim 26, wherein the communication medium is a telephone.

33. The system of claim 32, wherein the access code is a telephone number for the telephone.

* * * * *